(12) United States Patent
Kurtz

(10) Patent No.: US 8,230,843 B2
(45) Date of Patent: Jul. 31, 2012

(54) COOLER BYPASS TO REDUCE CONDENSATE IN A LOW-PRESSURE EGR SYSTEM

(75) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 12/689,936

(22) Filed: Jan. 19, 2010

(65) Prior Publication Data

US 2011/0023842 A1    Feb. 3, 2011

Related U.S. Application Data

(60) Provisional application No. 61/229,871, filed on Jul. 30, 2009.

(51) Int. Cl.
*F02B 47/08* (2006.01)
*F02B 47/04* (2006.01)

(52) U.S. Cl. .................................. 123/568.12

(58) Field of Classification Search ............. 123/568.12, 123/568.11, 542; 701/108; 60/605.1, 605.2, 60/278

See application file for complete search history.

(56) References Cited

U.S. PATENT DOCUMENTS

| | | | |
|---|---|---|---|
| 6,367,256 | B1 | 4/2002 | McKee |
| 6,934,621 | B2 | 8/2005 | Bhargava et al. |
| 7,188,512 | B1 * | 3/2007 | Wills .......................... 73/23.31 |
| 7,219,661 | B2 | 5/2007 | Aberle |
| 7,469,691 | B2 | 12/2008 | Joergl et al. |
| 2007/0089400 | A1 * | 4/2007 | Huang ............................ 60/284 |
| 2011/0094484 | A1 * | 4/2011 | Peterson .................. 123/568.12 |

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Various systems and methods are described for an exhaust gas recirculation (EGR) system including an EGR cooler coupled to a turbocharged engine in a vehicle. One example method comprises, under selected operating conditions, controlling a mixture temperature of cooled and uncooled EGR at a mixing location upstream of an intake passage inlet by routing at least a portion of exhaust gas through a bypass around the EGR cooler.

21 Claims, 4 Drawing Sheets

COOLER BYPASS TO REDUCE CONDENSATE IN A LOW-PRESSURE EGR SYSTEM

CROSS-REFERENCE TO RELATED APPLICATION

This application claims priority to U.S. Provisional Patent Application Ser. No. 61/229,871, entitled "COOLER BYPASS TO REDUCE CONDENSATE ON A LOW-PRESSURE EGR SYSTEM," filed Jul. 30, 2009, the disclosure of which is hereby incorporated by reference in its entirety and for all purposes.

TECHNICAL FIELD

The present application relates generally to a low-pressure exhaust gas recirculation system coupled to an engine in a motor vehicle.

BACKGROUND AND SUMMARY

It may desirable to run at least some low-pressure exhaust gas recirculation (LP-EGR) during an engine and catalyst warm-up phase to increase heat flux to the aftertreatment devices and to reduce surge while running enough EGR during warm-up to control $NO_x$. However, EGR coolers can condense water out, especially before engine coolant temperature warms to its operating temperature, (e.g., when engine coolant is lower than its warmed-up operating temperature). This can be problematic in any EGR system, but water droplets formed in a low-pressure EGR circuit can particularly degrade an aluminum compressor wheel operating at high speed. One solution is to only use low-pressure EGR during selected coolant temperature ranges; however, this will limit the amount of EGR one can use due to intake manifold temperature and surge limitations.

One method for reducing condensation is disclosed in U.S. Pat. No. 7,469,691. In the cited reference, EGR is routed through a bypass around an EGR cooler to an intake passage of the engine. The EGR is then mixed with intake air in the intake passage before mixing with cooled EGR. However, with the addition of cooled EGR just before the mixture enters a compressor of a turbocharger, a possibility of condensate formation remains in the gases entering the compressor.

The inventors herein have recognized the above issues and have devised an approach to at least partially address them. In one example, a method for an exhaust gas recirculation (EGR) system including an EGR cooler coupled to a turbocharged engine in a vehicle is disclosed. The method comprises, under selected operating conditions, controlling a mixture temperature of cooled and uncooled EGR at a mixing location upstream of an intake passage inlet by routing at least a portion of exhaust gas through a bypass around the EGR cooler.

For example, LP-EGR may be desired under cold start conditions in which the coolant temperature is below a threshold temperature. An EGR cooler bypass valve may be adjusted such that at least a portion of the EGR is routed around the EGR cooler and thus remains uncooled. As such, the temperature of the mixture of cooled and uncooled EGR, and thus the temperature of EGR entering the intake passage, may be controlled to be above a threshold temperature. In this manner, formation of condensate may be reduced, thus reducing a chance of compressor degradation due to condensate formation in the LP-EGR system during a cold engine start.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for an exhaust gas recirculation (EGR) system coupled to a turbocharged engine in a motor vehicle. In one example, a proportional EGR cooler bypass is coupled in a low-pressure EGR system to modulate amounts of cooled and uncooled EGR. The amount of bypass around the cooler (e.g., amount of uncooled EGR) may be adjusted to control the mixture temperature after the cooler where cooled and uncooled EGR is combined, to a desired temperature, e.g., via feedback control. In one example, the level of bypass is adjusted to provide a mixture temperature high enough to reduce water condensate formation after the mixing location. This may enable low-pressure EGR without reducing (e.g., while maintaining) the total EGR rate at a desired total EGR rate, even during engine and catalyst warm-up operation. Further, in some embodiments, a mixture temperature of low-pressure EGR and intake air may be controlled to further reduce formation of condensate in the intake passage upstream of the compressor. For example, a throttle valve in the intake passage may be adjusted to the control the mixture temperature of intake air and EGR or a low-pressure EGR valve may be adjusted. The above approach may thus enable use of low-pressure EGR with low coolant temperature (e.g., during warm-up and while coolant temperature is less than a threshold) without causing compressor durability issues.

Figure 1:
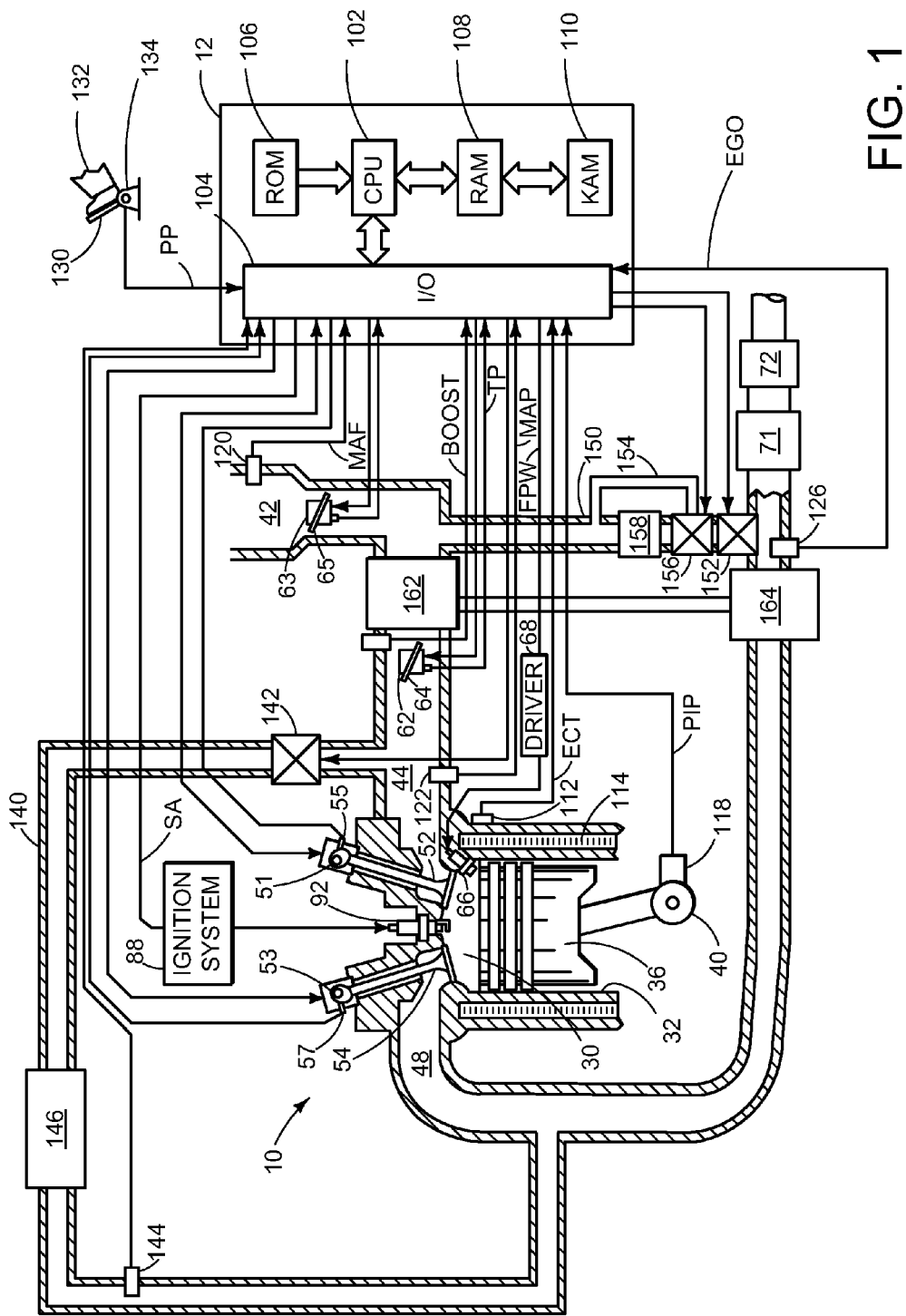
FIG. 1 shows a schematic diagram of an engine with a turbocharger and an exhaust gas recirculation system

Referring now to FIG. 1, is a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via high-pressure EGR(HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). Further, in some embodiments, during operation of engine 10, emission control devices 71 and 72 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
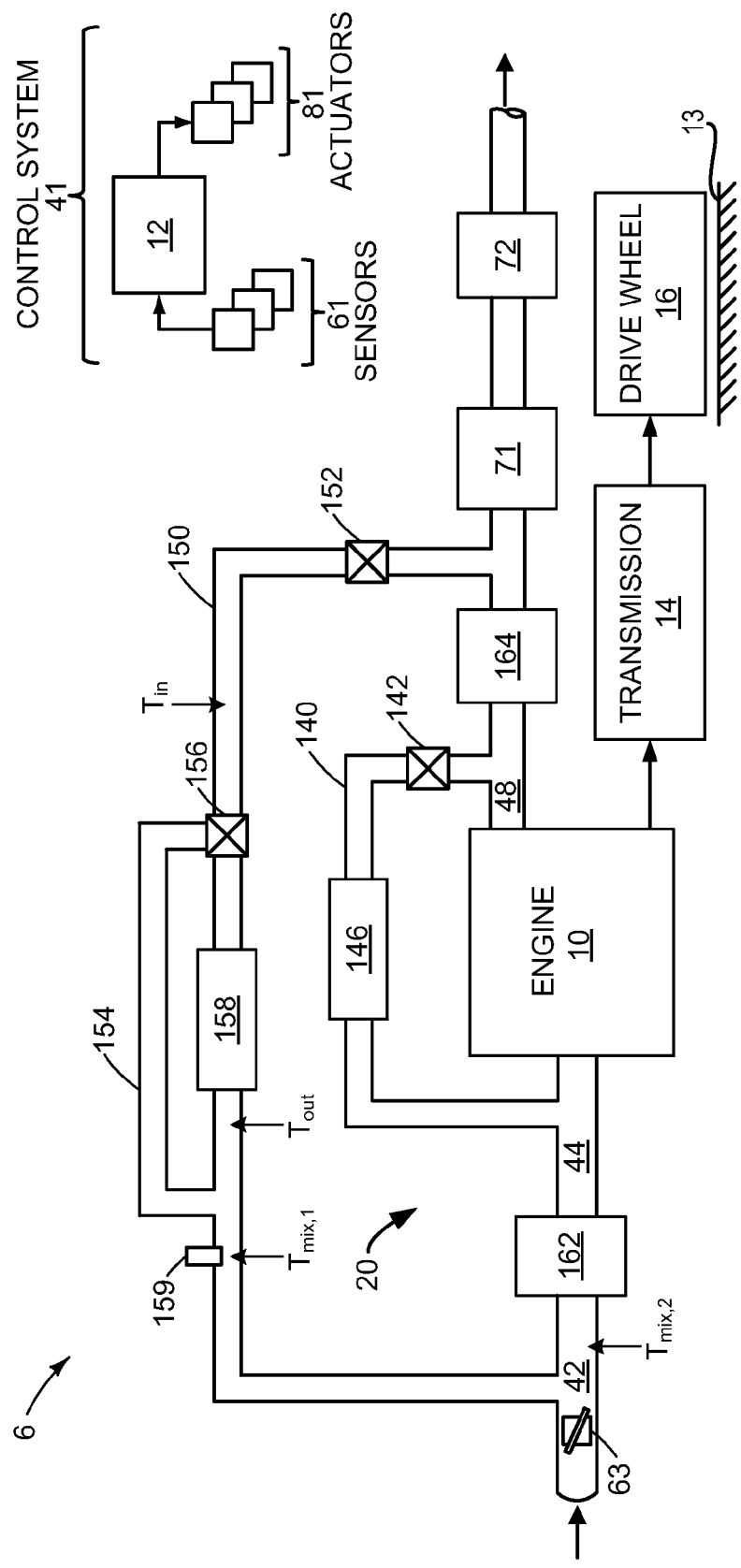
FIG. 2 shows a block diagram of an engine including a low-pressure exhaust gas recirculation system with an exhaust gas recirculation cooler and a cooler bypass.

Turning to FIG. 2, the figure schematically depicts another example embodiment of an engine with a low-pressure exhaust gas recirculation system. In particular, the configuration depicted in FIG. 2 shows a vehicle system 6 which includes a low-pressure EGR system having a cooler 158 with a bypass 154. Vehicle system 6 further includes an internal combustion engine 10, described above with particular reference to FIG. 1, coupled to transmission 14. Transmission 14 may be a manual transmission, automatic transmission, or combinations thereof. Further, various additional components may be included, such as a torque converter, and/or other gears such as a final drive unit, etc. Transmission 14 is shown coupled to drive wheel 16, which in turn is in contact with road surface 13.

Further, vehicle system 6 may include an exhaust passage 48 eventually leading to a tailpipe (not shown in FIG. 2) that eventually routes exhaust gas to the atmosphere. As described above, the exhaust passage 48 of vehicle system 6 may include one or more emission control devices such as a three way catalyst 71 and a particulate filter 72. Vehicle system 6 may further include a turbocharger having a compressor 162 which is at least partially driven by a turbine 164 arranged along exhaust passage 48, as described above.

Vehicle system 6 may include control system 41. Control system 41 is shown having a controller 12 which receives information from a plurality of sensors 61 (various examples of which are described herein) and sends control signals to a plurality of actuators 81 (various examples of which are described herein). As one example, sensors 61 may include a temperature sensor 159 located in the low-pressure EGR system for determining a temperature of a mixture of cooled and uncooled EGR. As another example, actuators 81 may include control valves such as the low-pressure EGR valve 152 and the throttle 63 in the intake manifold 44.

Further, in the disclosed embodiments, an exhaust gas recirculation (EGR) system may route a desired portion of exhaust gas from exhaust passage 48 upstream of turbine 164 to intake passage 44 via EGR passage 140, the exhaust gas entering intake passage 44 downstream of compressor 162. As such, the EGR system may be a high-pressure EGR(HP-EGR) system. The amount of HP-EGR provided to intake manifold 44 may be varied by controller 12 via HP-EGR valve 142 responsive to engine operating conditions, such as engine speed, engine load, etc. HP-EGR passage 140 may include an EGR cooler 146 coupled to a cooling system of the vehicle (not shown in FIG. 2), which may lower the temperature of exhaust gas flowing through the high-pressure EGR passage.

Further still, another exhaust gas recirculation system may route a desired portion of exhaust gas from exhaust gas passage 48 downstream of turbine 164 to intake passage 44 upstream of compressor 162 via EGR passage 150; thus, the EGR system may be a low-pressure EGR (LP-EGR) system. The total amount of LP-EGR provided to intake passage 42 may be varied by controller 12 via LP-EGR valve 152 responsive to engine operating conditions. LP-EGR passage 150 may include a cooler 158 coupled to a cooling system of the vehicle (not shown in FIG. 2) for rejecting heat from EGR gasses to engine coolant.

Further, the low-pressure EGR system may include a bypass 154 for routing exhaust gas around EGR cooler 158 to a location in the LP-EGR passage 150 that is downstream of EGR cooler 158 and upstream of a junction with intake passage 42. The LP-EGR system may further include bypass valve 156 which may be controlled by controller 12 for modulating an amount of exhaust gas that passes through bypass 154 (e.g., bypass valve 156 may be opened to allow 60% of the total LP-EGR to flow into bypass 154 and 40% of the total LP-EGR to flow into cooler 158). In this manner, an amount of LP-EGR may remain uncooled and thus at a higher temperature than the LP-EGR that passes through cooler 158. The low-pressure EGR system may also include one or more sensors for measuring the temperature of the exhaust gas. Although only temperature sensor 159 is shown in FIG. 2 for determining a temperature of the mixture of cooled and uncooled EGR ($T_{mix,1}$), the LP-EGR system may alternatively include sensors for determining a temperature of the exhaust gas before it enters EGR cooler 158 ($T_{in}$), a temperature of exhaust gas after it leaves cooler 158 ($T_{out}$), etc., through which $T_{mix,1}$ could be estimated, for example.

Figure 3:
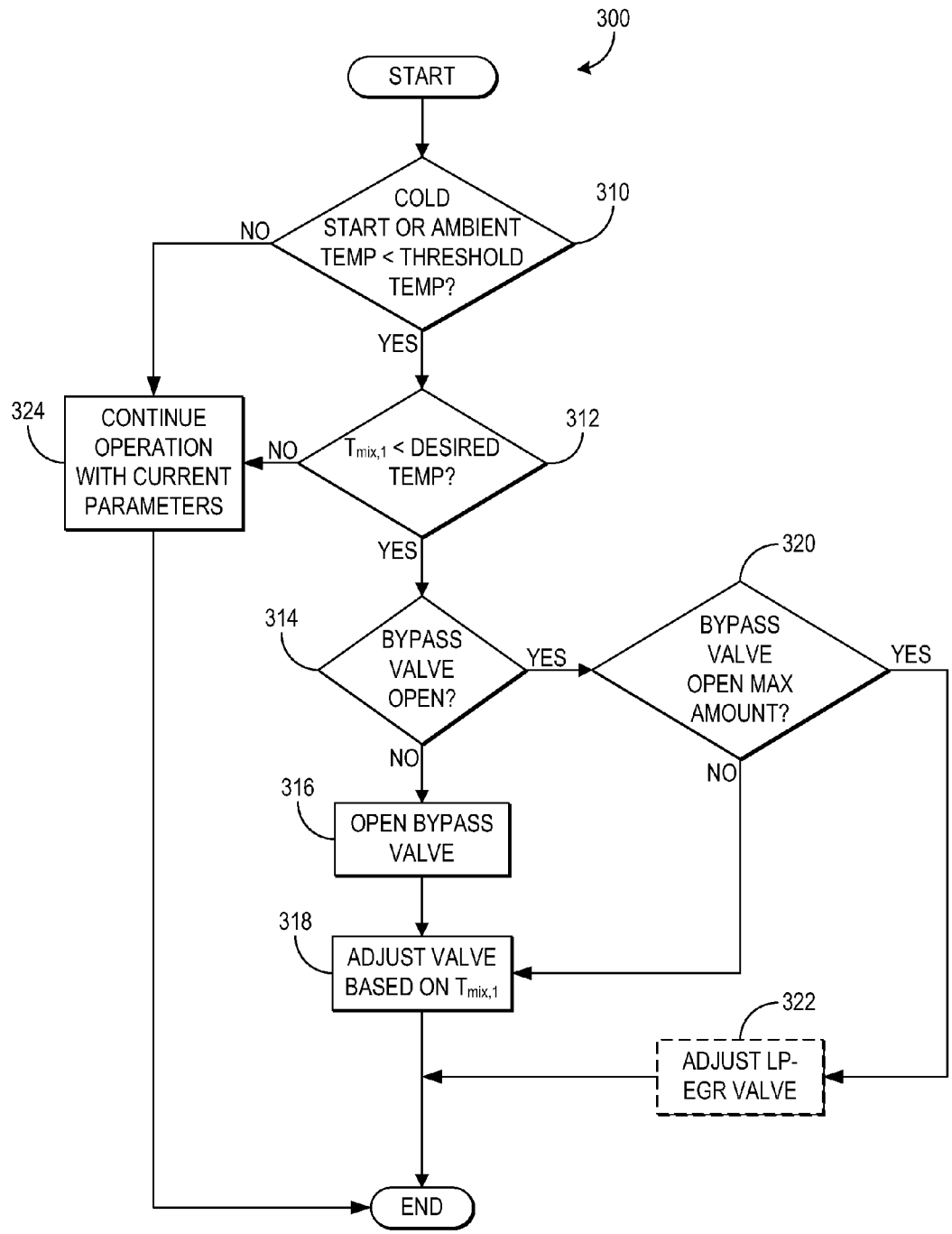
FIG. 3 shows a flow chart illustrating a control routine for a low-pressure exhaust gas recirculation system.
Figure 4:
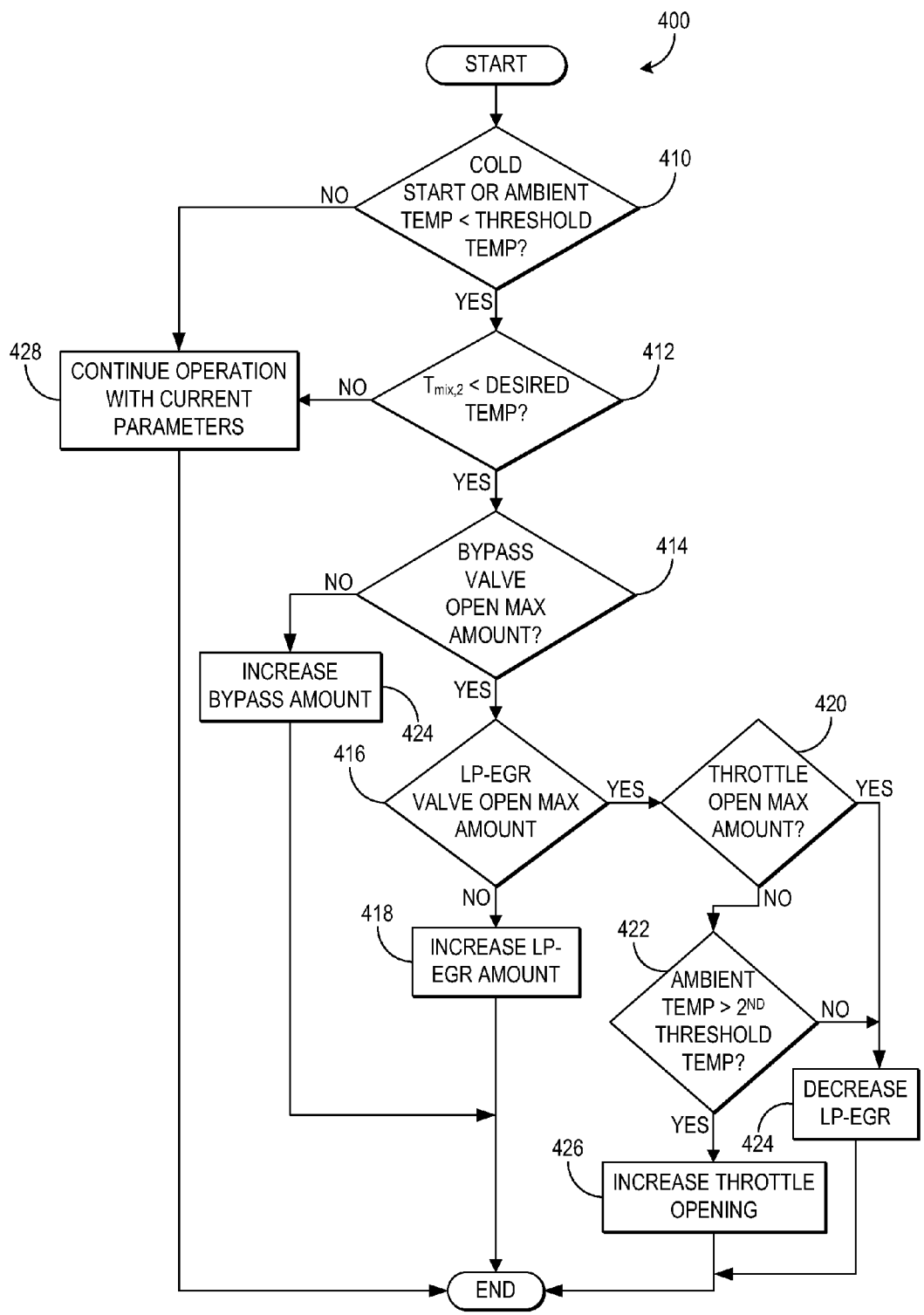
FIG. 4 shows a flow chart illustrating another control routine for a low-pressure exhaust gas recirculation system.

Example control routines for a low-pressure exhaust gas recirculation system coupled to an engine, such as the LP-EGR systems coupled to engine 10 described above with reference to FIGS. 1 and 2, are shown in FIGS. 3 and 4. FIG. 3 illustrates a routine for controlling a temperature of a first mixture of cooled and uncooled low-pressure EGR. FIG. 4 illustrates a routine for controlling a second mixture of low-pressure EGR and fresh air in the intake manifold of the engine.

Referring first to FIG. 3, a routine 300 for controlling a first mixture temperature in a low-pressure exhaust gas recirculation (LP-EGR) system is shown. Specifically, routine 300 controls EGR flow through an LP-EGR cooler based on a desired mixture temperature of cooled and uncooled EGR.

At 310 of routine 300, it is determined if the engine is under cold start conditions or if the ambient temperature (e.g., the temperature outside the vehicle) is less than a threshold temperature. As referred to herein, "cold start" implies the engine is started under conditions in which the engine has cooled to ambient conditions, which may be relatively hot or cold. Further, during cold start conditions, the engine coolant temperature may be below a threshold value (e.g., the temperature at which a thermostat opens). If it is determined that the engine is under cold start conditions or that the ambient temperature is less than the threshold temperature, routine 300 proceeds to 312 where it is determined if a temperature of the first mixture ($T_{mix,1}$) is less than a desired temperature. The desired temperature may be based on the instantaneous engine coolant temperature or the ambient temperature and the percentage of LP EGR flow to total flow (including fresh air), for example. In other examples, the desired temperature may be adjusted based on an instantaneous LP-EGR coolant temperature. In some embodiments, the first mixture temperature may be measured by a temperature sensor positioned in the LP-EGR system. In other embodiments, the temperature of the exhaust gas entering the cooler and the temperature of the EGR exiting the cooler, as well as the amounts of EGR flowing through the bypass and the cooler may be used to determine the temperature of the mixture of cooled and uncooled EGR. If it is determined that the engine is not under cold start conditions or the ambient temperature is not less than the threshold temperature, or if $T_{mix,1}$ exceeds the desired temperature, routine 300 moves to 324 where engine operation continues under the current operating parameters.

On the other hand, if it is determined that $T_{mix,1}$ is less than the desired temperature, routine 300 continues to 314 where it is determined if the LP-EGR cooler bypass valve is open (e.g., if exhaust gas is being routed through the bypass). If the bypass valve is not open, routine 300 proceeds to 316 where the bypass valve is opened. If it is determined that the bypass valve is open, routine 300 moves to 320 where it is determined if the bypass valve is open a maximum amount. As referred to herein, "bypass valve is open a maximum amount" implies the cooler bypass valve is in a position such that a maximum amount of exhaust gas flows through the bypass and substantially no exhaust gas flows through the EGR cooler. In some embodiments, depending on the cooler bypass design, opening the bypass valve a maximum amount may not substantially cut off flow through the cooler, but rather open up the bypass, which may be the path of least resistance; thus, the flow through the bypass line is maximized.

Once the bypass valve is opened at 316 or if it is determined that the bypass valve is not open a maximum amount at 320, routine 300 of FIG. 3 moves to 318 where the bypass valve is adjusted based on the temperature of the mixture of cooled and uncooled EGR ($T_{mix,1}$). For example, the bypass valve opening may be increased to allow more exhaust gas to flow through the bypass (and less exhaust gas to flow through the EGR cooler) thereby increasing $T_{mix,1}$.

In some examples, if it is determined that the bypass valve is open a maximum amount, routine 300 continues to 322 where the LP-EGR valve is adjusted to control the total amount of exhaust gas entering the LP-EGR system to address water condensate formation. As an example, the LP-EGR valve may be adjusted to decrease the total amount of LP-EGR if the bypass valve is open a maximum amount and $T_{mix,1}$ is still less than the desired temperature. In this manner, the total amount of LP-EGR is decreased because the mixture temperature cannot reach the desired value and there is a greater chance of condensate formation.

As described above, the bypass may be adjusted to provide the desired mixture temperature, where the desired mixture temperature may be determined from coolant temperature or ambient temperature, while maintaining a desired total LP-EGR flow rate. As such, formation of condensate in the LP-EGR passage, which may have difficulty evaporating before entering the compressor of the turbocharger, may be reduced. In some embodiments, the total LP-EGR flow rate may be adjusted if the desired temperature is not reached and the bypass valve is open a maximum amount. Furthermore, as will be described below, the LP-EGR valve or a throttle in the intake passage may be adjusted to control the temperature of a second mixture comprising the first mixture and fresh air.

FIG. 4 shows a flow chart illustrating a routine 400 for controlling the temperature of a second mixture of LP-EGR and fresh air. Specifically, routine 400 controls the LP-EGR valve as well as a throttle in the intake passage based on the instantaneous temperature of the second mixture and a desired temperature of the second mixture.

At 410 of routine 400, it is determined if the engine is under cold start conditions or if the ambient temperature is less than a threshold temperature. As stated above, "cold start" implies the engine is started under conditions in which the engine has cooled to ambient conditions, which may be relatively hot or cold. If it is determined that the engine is under cold start conditions or if the ambient temperature is less than the threshold temperature, routine 400 proceeds to 412 where it is determined if the temperature of a second mixture ($T_{mix,2}$) is less than a desired temperature. The second mixture may be comprised of the first mixture (e.g., the mixture of cooled and uncooled low-pressure EGR) and fresh air from outside of the vehicle. In some embodiments, the temperature of the second mixture may be measured by a temperature sensor in the intake passage. In other embodiments, the temperature of the second mixture may be determined based on the amounts of fresh air and EGR in the mixture and their respective temperatures. Furthermore, the desired temperature of the second mixture may have a value such that when intake air (e.g., fresh air) is combined with the mixture of cooled and uncooled LP-EGR, condensate may not form in the intake passage upstream of the compressor. As such, the desired temperature may be based on a dew point of the temperature of the air in the intake passage. If it is determined that the engine is not under cold start conditions or the ambient temperature exceeds a threshold value, or if $T_{mix,2}$ is greater than the desired temperature, routine 400 moves to 428 where engine operation continues with the current operating parameters.

On the other hand, if it is determined that $T_{mix,2}$ is less than the desired temperature, routine 400 moves to 414 where it is determined if the bypass valve is open a maximum amount. As described above, if the bypass valve is open a maximum amount, a maximum amount of exhaust gas is flowing through the bypass and substantially zero exhaust gas is flowing through the EGR cooler. If the bypass is not open a maximum amount, routine 400 moves to 430 where the bypass opening is increased (e.g., more exhaust gas flows through the bypass). In this way, the first mixture contains a greater amount of uncooled EGR and the temperature of the second mixture may be increased.

If it is determined that the bypass valve is open a maximum amount at 414 of routine 400 in FIG. 4, routine 400 proceeds to 416 where it is determined if the LP-EGR valve is open a maximum amount (e.g., a maximum amount of LP-EGR is flowing through the LP-EGR system). If it is determined that the LP-EGR valve is not open a maximum amount, routine 400 proceeds to 418 where the amount of LP-EGR is increased. In this manner, a greater amount of the first mixture, which may be controlled to a desired temperature, may be added to the second mixture thereby increasing the temperature of the second mixture.

In contrast, if the LP-EGR valve is open a maximum amount, routine 400 of FIG. 4 moves to 420 where it is determined if the throttle is open a maximum amount. When the throttle is open a maximum amount, a maximum amount of fresh air passes into the intake passage from outside the vehicle. As such, the throttle may not be modulated to increase the amount of fresh air in the second mixture. Thus, if it is determined that the throttle is open a maximum amount, routine 400 moves to 424 where the total amount of low-pressure EGR is decreased. In some examples, an HP-EGR rate may be increased based on the amount of decreased LP-EGR in order to maintain a total EGR rate. In this manner, the amount of LP-EGR entering the intake passage is decreased and the possibility of condensate formation upstream of the compressor may be reduced.

On the other hand, if the throttle is not open a maximum amount, routine 400 proceeds to 422 where it is determined if the ambient temperature is greater than a second threshold temperature. If the ambient temperature is not greater than the second threshold temperature, increasing an amount of fresh air in the second mixture may decrease the temperature of the second mixture rather than increasing it to assist in reaching the desired temperature. Thus, if the ambient temperature is less than a second threshold amount, routine 400 moves to 424 where an amount of LP-EGR is decreased, as described above.

If it is determined that the ambient temperature is greater than a second threshold temperature, routine 400 of FIG. 4 continues to 426 where the throttle opening is increased. The amount the throttle opening is increased may depend on the humidity of the fresh air and/or the desired temperature of the second mixture, for example. In this manner, the temperature of the second mixture ($T_{mix,2}$) may be increased to reduce the possibility of condensate formation upstream of the compressor.

Thus, condensate formation and degradation of the compressor of the turbocharger may be reduced while still using low-pressure exhaust gas recirculation during a cold engine start or during periods when the ambient temperature is less than a threshold temperature. As described above, the LP-EGR system may include a bypass that has a controllable valve for routing at least some exhaust gas around the EGR cooler in the LP-EGR system. In this manner, a mixture temperature of cooled and uncooled EGR may be controlled to be a desired value. Additionally, the LP-EGR valve and/or a throttle may be adjusted to control the temperature of an LP-EGR/fresh air mixture in the intake passage further reducing the chance of condensate formation upstream of the compressor in the intake passage of the engine.

In an alternative embodiment, in order to maintain temperature of the mixture above the desired mixture temperature, a first step would be to reduce the amount of LP-EGR (with the option of increasing HP-EGR accordingly to maintain total desired EGR rate, or desired intake oxygen concentration at the target value). Then, as a second step, if reducing LP-EGR causes the mixture of cooled and un-cooled EGR ($T_{mix,1}$) to drop below a threshold value, then the intake throttle may be used to reduce the inlet air flow.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an exhaust gas recirculation (EGR) system including an EGR cooler coupled to a turbocharged engine in a vehicle, comprising:
   under selected EGR coolant temperatures, controlling a mixture temperature of cooled and uncooled EGR at a mixing location upstream of an intake passage inlet by routing at least a portion of exhaust gas through a bypass around the EGR cooler, wherein a desired mixture temperature is based on an EGR coolant temperature.

2. The method of claim 1, wherein the cooled and uncooled EGR are mixed before entering an intake passage of the engine, and wherein the mixture temperature is maintained above a threshold mixture temperature to reduce condensate in the mixture.

3. The method of claim 1, wherein the EGR system includes an EGR cooler bypass valve that adjusts a flow of EGR through the bypass.

4. The method of claim 1, wherein the EGR system is a low-pressure EGR system.

5. The method of claim 1, wherein a sensor generates an indication of the mixture temperature.

6. The method of claim 1, further comprising delivering the mixture of cooled and uncooled EGR to an intake passage upstream of a compressor of the engine where it is mixed with intake air.

7. A method for an exhaust gas recirculation (EGR) system including an EGR cooler coupled to a turbocharged engine in a vehicle, comprising:
   under selected operating conditions, controlling a mixture temperature of cooled and uncooled EGR at a mixing location upstream of an intake passage inlet by routing at least a portion of exhaust gas through a bypass around the EGR cooler; and
   estimating the mixture temperature based on a temperature of exhaust gas entering the EGR cooler, a temperature of exhaust gas exiting the EGR cooler, and an amount of exhaust gas passing through the bypass and an amount of exhaust gas passing through the EGR cooler.

8. The method of claim 7, wherein the selected operating conditions include cold engine start.

9. A method for a low-pressure exhaust gas recirculation (LP-EGR) system including an LP-EGR cooler coupled to a turbocharged engine in a vehicle, comprising:
   under selected operating conditions:
      routing a first amount of EGR through the LP-EGR cooler;
      routing a second amount of EGR through a bypass around the LP-EGR cooler to a location downstream of the LP-EGR cooler and upstream of an intake passage inlet to mix with the first amount of EGR and generate a first mixture of cooled EGR and uncooled EGR;

delivering the first mixture to the intake passage where it is mixed with fresh air to generate a second mixture;

adjusting a first valve based on a temperature of the first mixture; and adjusting a second valve based on a temperature of the second mixture.

10. The method of claim 9, wherein the first valve is an LP-EGR cooler bypass valve, and wherein adjusting the bypass valve modulates the second amount of bypass EGR in the first mixture.

11. The method of claim 9, wherein the second valve is a throttle coupled to the intake passage, and wherein adjusting the throttle modulates an amount of fresh air in the second mixture.

12. The method of claim 9, wherein the second valve is an LP-EGR valve, and wherein adjusting the LP-EGR valve modulates a total flow rate of LP-EGR and an amount of the first mixture in the second mixture.

13. The method of claim 9, wherein selected operating conditions include cold engine start.

14. The method of claim 9, wherein selected operating conditions include LP-EGR coolant temperature and a desired temperature of the first mixture is based on the LP-EGR coolant temperature.

15. The method of claim 9, further comprising estimating the first mixture temperature based on an amount of exhaust gas passing through the bypass and an amount of exhaust gas passing through the LP-EGR cooler, and a temperature of exhaust gas entering the LP-EGR cooler and a temperature of exhaust gas exiting the LP-EGR cooler.

16. The method of claim 9, further comprising estimating the second mixture temperature based on an amount and temperature of intake air and an amount and temperature of the first mixture.

17. A system for an engine in a vehicle, comprising:
a turbocharger;
a low-pressure exhaust gas recirculation (LP-EGR) system including an LP-EGR cooler and an LP-EGR cooler bypass;
an LP-EGR cooler bypass valve;
a control system comprising a computer readable storage medium, the medium comprising instructions for, under selected operating conditions:
routing a first amount of EGR through the cooler;
routing a second amount of EGR through the cooler bypass to a location downstream of the cooler and upstream of an intake passage inlet to generate a first mixture of cooled EGR and uncooled EGR;
delivering the first mixture to the intake passage where it is mixed with fresh air to generate a second mixture;
adjusting a first valve based on a temperature of the first mixture; and
adjusting a second valve based on a temperature of the second mixture.

18. The system of claim 17, wherein the first valve is the cooler bypass valve and adjusting the cooler bypass valve modulates an amount of bypass EGR in the first mixture.

19. The system of claim 17, wherein selected operating conditions include cold start and coolant temperature less than a threshold temperature.

20. The system of claim 17, further comprising instructions for adjusting a flow rate of total LP-EGR when the cooler bypass valve is at a maximum position and the second mixture temperature is less than desired, the cooler bypass receiving a maximum amount of exhaust gas when the cooler bypass valve is in a maximum position, and where the second valve is an LP-EGR valve.

21. The system of claim 17, further comprising instructions for adjusting the second valve when the second mixture temperature is less than desired, and where the second valve is a throttle in the intake passage positioned upstream of the LP-EGR system.

* * * * *